US011886405B2

(12) United States Patent
Eckert (10) Patent No.: US 11,886,405 B2
(45) Date of Patent: Jan. 30, 2024

(54) SYSTEM AND METHOD FOR EXTRACTING AND CATALOGING SPECIFIED FILE ACTIVITY DATA

(71) Applicant: Teracloud ApS, Copenhagen (DK)

(72) Inventor: Paul J. Eckert, Newtown Square, PA (US)

(73) Assignee: Teracloud ApS, Copenhagen (DK)

( * ) Notice: Subject to any disclaimer, the term of this patent is extended or adjusted under 35 U.S.C. 154(b) by 0 days.

(21) Appl. No.: 17/714,524

(22) Filed: Apr. 6, 2022

(65) Prior Publication Data

US 2022/0335025 A1    Oct. 20, 2022

Related U.S. Application Data

(60) Provisional application No. 63/175,798, filed on Apr. 16, 2021.

(51) Int. Cl.
*G06F 16/21*    (2019.01)
(52) U.S. Cl.
CPC .................. *G06F 16/219* (2019.01)
(58) Field of Classification Search
CPC .. G06F 16/219; G06F 11/1458; G06F 16/188; G06F 16/2477
See application file for complete search history.

(56) References Cited

U.S. PATENT DOCUMENTS

| | | | | |
|---|---|---|---|---|
| 8,639,625 | B1 * | 1/2014 | Ginter | G06Q 20/12 705/50 |
| 9,218,345 | B1 * | 12/2015 | Becker | G06F 11/1471 |
| 10,817,392 | B1 * | 10/2020 | McAuliffe | G06F 11/2094 |
| 2011/0145199 | A1 | 6/2011 | Prasad Palagummi | |
| 2017/0091046 | A1 | 3/2017 | Bangalore et al. | |
| 2018/0329919 | A1 | 11/2018 | Erdmann et al. | |
| 2022/0131879 | A1 * | 4/2022 | Naik | H04L 63/1416 |

FOREIGN PATENT DOCUMENTS

WO    2015181612 A1    12/2015

OTHER PUBLICATIONS

Extended European Search Report for European Application No. 22168056.4, dated Aug. 18, 2022, 8 pages.
Saudia Arabia Examination Report for Application No. 122430920, dated Oct. 26, 2023 with translation, 11 pages.

* cited by examiner

*Primary Examiner* — Merilyn P Nguyen
(74) *Attorney, Agent, or Firm* — RatnerPrestia (57) ABSTRACT

A system for use in restoring data processing capabilities in the event of an interruption. System including a user catalog program that when executed by a processor configures the system to store indexes of data utilized by the system, a system management facility (SMF) program that when executed by the processor configures the system to create SMF audit records that track the catalog activity as SMF data, and a virtual catalog program that when executed by the processor configures the system to intercept portions of the SMF data over a timeline. The portions correspond to the creation, deletion and modification of the data files, and catalog the intercepted portions of SMF data over the timeline.

15 Claims, 5 Drawing Sheets

SYSTEM AND METHOD FOR EXTRACTING AND CATALOGING SPECIFIED FILE ACTIVITY DATA

CROSS REFERENCE TO RELATED APPLICATION

This application claims benefit of priority to U.S. Provisional Application No. 63/175,798, filed Apr. 16, 2021. The contents of this application are incorporated herein by reference.

TECHNICAL FIELD

The present examples relate to techniques and processes for extracting and cataloging specified file activity data.

BACKGROUND

Mainframe computing is a computing platform used today by the largest companies in the world. A mainframe often processes many workloads such as accounts receivable, general ledger, payroll and a variety of applications needed for specific business requirements. These workloads are commonly referred to as jobs.

A mainframe is a complex environment including databases and datasets (e.g., files). These data typically reside on a direct access storage device (DASD) or disk drive. In addition to DASD, mainframe applications also rely on one or more tape drives/devices to store portions of these data. Tape drive(s) can be the primary repository of vital information within a mainframe application. Tape today can be either physical tape which must be mounted on hardware to be read or virtual tape which is disk-based storage emulating physical tape.

SUMMARY

An embodiment includes a system for use in restoring data processing capabilities in the event of an interruption, comprising a processor, a storage device accessible by the processor, a user catalog program that when executed by the processor configures the system to store indexes of data utilized by the system. The system also comprises a system management facility (SMF) program that when executed by the processor configures the system to create SMF audit records that track the catalog activity as SMF data, and a virtual catalog program that when executed by the processor configures the system to intercept portions of the SMF data over a timeline. The portions corresponding to the creation, deletion and modification of the data files, and catalog the intercepted portions of SMF data over the timeline. After an interruption is detected, the processor restores data processing capabilities of the system based on a combination of the stored indexes from the user catalog program and the intercepted portions of SMF data from the virtual catalog program.

An embodiment includes a non-transitory computer readable medium for use in restoring data processing capabilities in the event of an interruption, comprising a user catalog program embodied in the medium, that when executed by a processor configures the system to store indexes of data utilized by the system. The non-transitory computer readable medium also comprises a system management facility (SMF) program embodied in the medium, that when executed by the processor configures the system to create SMF audit records that track the catalog activity as SMF data, and a virtual catalog program embodied in the medium, that when executed by the processor configures the system to intercept portions of the SMF data over a timeline. The portions corresponding to the creation, deletion and modification of the data files, and catalog the intercepted portions of SMF data over the timeline. After an interruption is detected, the processor restores data processing capabilities of the system based on a combination of the stored indexes from the user catalog program and the intercepted portions of SMF data from the virtual catalog program.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In an example mainframe environment, a job is a collection of programs, or job steps, instructing a processor to perform particular functions. When a job is represented as a sequence of job control language (JCL) statements, each job step is defined by an EXEC statement referencing a program and supported by DD, "data definition", statements which represent the datasets to be processed. While a job includes one or more programs, or job steps, a single job step may, in turn, represent a procedure, program and/or other process that includes one or more steps, functions, and/or other components that each perform some form of processing. Thus, a job step is a single entry within a job, but is not limited to performing a single step of processing. A job is also often referred to as a batch job, because a collection of JCL is processed in batch by the processor. In this mainframe environment, jobs are continually being processed. These jobs regularly reference datasets (e.g., files) as part of their processing. As such, at any given point in time, some number of jobs may have some number of datasets opened and may be processing data related to those opened datasets. Furthermore, a dataset may be accessed by more than one job, although typically not for writing at the same time. While each individual job may know which dataset(s) the job has opened at any given point in time, the mainframe environment and/or an application for managing the mainframe environment may not know which dataset(s) are opened and/or which job is processing which dataset(s) at that point in time. Thus, if a disaster or some other event occurs that interrupts processing by the mainframe environment or any number of jobs within the mainframe environment, individual(s), group(s) and/or organization(s) faced with restoring processing capabilities of the mainframe environment will not know which dataset(s) were impacted by the disaster or other event. Determining the inconsistencies within and among the various replicated storage systems utilized by a particular mainframe application is difficult because detailed information regarding times at which jobs and/or job steps begin and end and at which the datasets are opened and closed is not readily available.

Therefore, it would be beneficial to have a system to track activity and location of specified data over a timeline (e.g. DATASET.ONE is created in volume 1 on date 1 and then deleted from volume 1 on date 2, etc.). One example for accomplishing this is a system including a processor, multiple storages device accessible by the processor, a system management facility (SMF) program that when executed by the processor configures the system to extract and store data cataloging the creation, deletion and modification of data files as SMF data, and a virtual catalog program. When executed by the processor, the virtual catalog program configures the system to intercept portions of the SMF data over a timeline, the portions corresponding to activity of user specified data files, catalog the selected portions of SMF data over the timeline, and output the selected portions of SMF data in response to a request by a user, selected portions of SMF data identifying the creation, deletion and modification of the user specified data files over the timeline. An emphasis of the virtual catalog program is focused on tracking dataset actions (e.g. create, update, delete, rename, etc.) and is indexed by the name of the dataset and a timestamp of the dataset. Therefore, the virtual catalog program is keyed by the dataset and presents a time dimensional depiction of requested datasets and how they are utilized.

The examples described below improve the ability to determine which dataset(s) is/are currently opened and which job(s) is/are currently processing which dataset(s). In one example, system records are utilized to determine which job is currently processing which dataset. For example, a system management facility (SMF) record is generated each time a job is initiated or terminated. An SMF record is also generated, for example, each time a job step within a job is terminated. Furthermore, an SMF record is generated, for example, each time a virtual storage access method (VSAM) dataset is catalogued or deleted as well as each time a non-VSAM dataset is cataloged or deleted.

Specific SMF data is intercepted by a virtual catalog program and stored in a virtual catalog. An exemplary embodiment of this interception and storage of SMF data is referred to herein as a "3D Virtual Katalog™". In the event of a disaster or other interruption of processing in the mainframe environment, rather than isolating and parsing through the entire set of SMF data (e.g. sets of SMF data from different systems in an environment), the data in the 3D Virtual Katalog is reviewed to determine the storage history of the pertinent data. In this way, jobs and/or datasets can be located so that appropriate actions to be taken for restoration of processing in the mainframe environment from the proper location.

Figure 1:
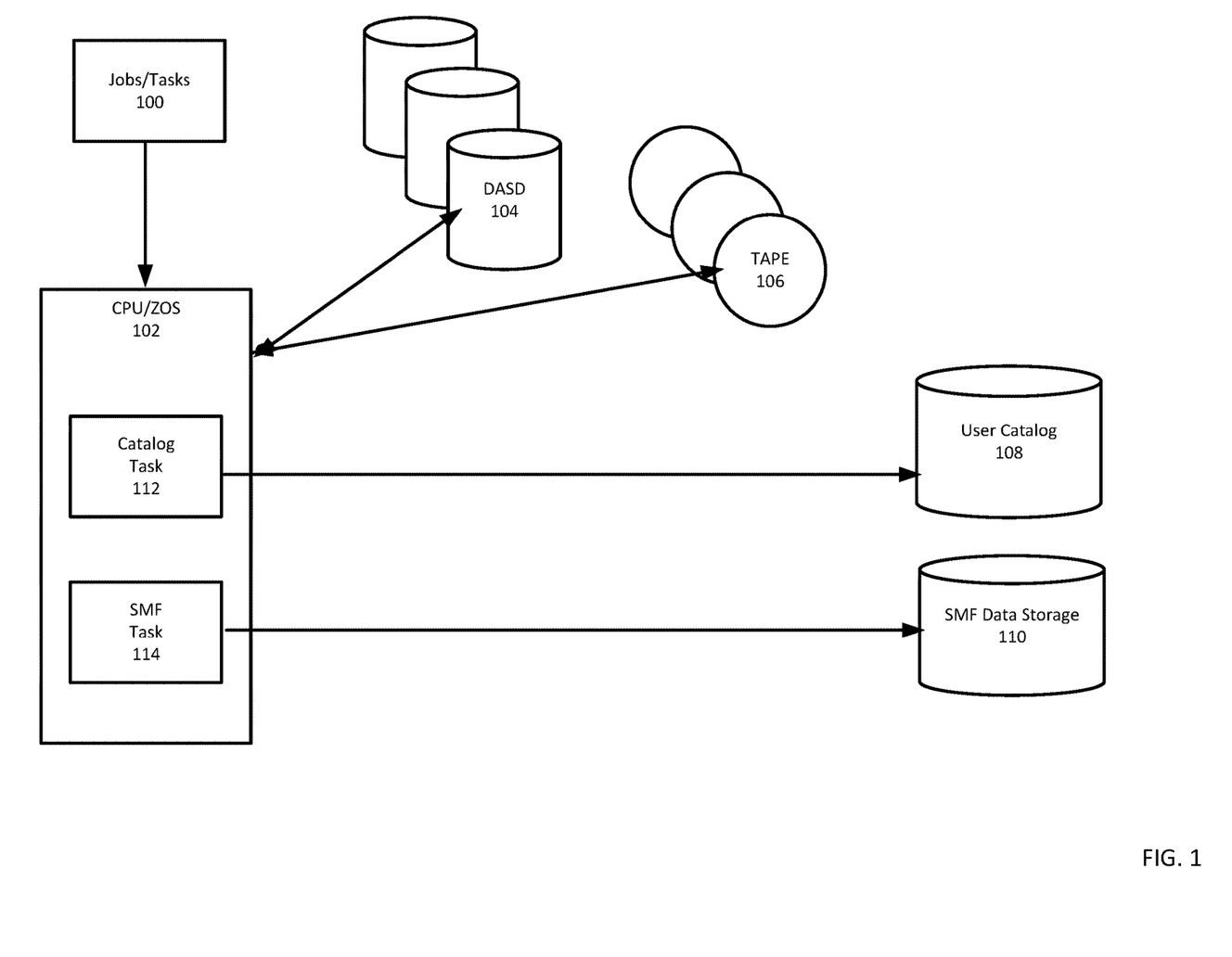
FIG. 1 is a process flow diagram of an example of a process for reading and writing to DASD and Tape and creating and recording system management facility data.

As shown in FIG. 1, the IBM mainframe, also known as the "z platform", includes CPU/ZOS 102 running the z/OS operating system executes jobs/tasks 100 reading and writing to DASD 104 and Tape 106, and utilizes a USERCATALOG system 108 for accounting for data that resides among the multitude of storage devices typically configured to a system. These user catalogs are a component of Data Facility product (DFP), and are an integral component of the Operating System (OS). As part of the operation of the system, jobs and tasks run which create, modify or delete data on the system and the Catalogue records this activity in a catalogue structure for referential integrity. The catalogue itself is an indexed file so that data can be located quickly if it exists in the storage environment. ICF is the acronym that describes this facility. ICF stands for Integrated Catalog Facility. All storage works on the concept that data (e.g. SYS2.DATASET.ONE, SYS3.DATASET.TWO, and SYS3.DATASET.THREE) is contained in a volume, either tape volume 106 or disk volume 104, also referred to as a DASD, direct access storage device. The distinction between tape 106 and DASD 104 is that DASD storage is online to the system, whereas tape data is more commonly offline and brought online when it is requested by a process or task. A DASD volume can contain multitudes of files also known as Datasets. Multiple tasks can access disk datasets on the same volume concurrently as there are usually multiple paths to get to the data on the same DASD volume. Tapes, on the other hand, are dedicated to being allocated to a single task at a time. Tape data can stack multiple datasets on a volume like DASD. However only 1 task can access 1 single dataset on a Tape volume at a time. Tape data is processed in a linear or sequential fashion. The primary relevant information for any dataset is the name of the dataset, the volume(s) to which the data resides, and in the case of Tape data, where in the linear tape, file sequence the data resides. An example of a catalog entry for DASD and tape datasets are shown below:

Some key fields in a catalogue record include: BCS, Basic Catalog Structure. Each record in a catalog entry includes in part of the following fields:

DATASET NAME: This is the key and only 1 record exists for each dataset

DEVICE TYPE: The device type that the data resides. e.g.: 3390 DASD device

VOLUME SERIAL: Each volume is six digits in length using characters or numbers

FILE SEQUENCE: Relative position of the dataset, particularly sequential TAPE

VOLUME SEQUENCE: The relative position of a volume for datasets that extend unto multiple volumes. This assures data is read in the proper chronological order.

EXAMPLE

| Dataset | Device Type | Volume Serial | File Sequence | Volume Sequence | Note |
|---|---|---|---|---|---|
| SYS2.DATASET.ONE | 3390 | PRD001 | 0 | 1 | Disk device type: 3390, file sequence is 0 for disk datasets |
| SYS2.DATASET.TWO | 3390 | PRD001 | 0 | 1 | 2 DATASETS on the same volume |
| SYS2.TAPE.DATASET.ONE | 3490 | 100000 | 1 | 1 | First dataset on a Tape device: 3490 |

In the above example, we see 4 datasets, 2 DASD (disk) and 2 Tape datasets. The 2 disk datasets reside on a 3390 DASD device and occupy space on the volume PRD001. The third and fourth datasets are tape datasets and reside on the single volume 100000. The file sequence depicts that data's relative position on the tape volume. The disk volumes maintain several volume structures which indicate where on a volume the data actually resides, these would be the VTOC, VTOC Index, as well as the VVDS. In both cases, the catalog keeps track of which volume(s) that the data resides. The volume sequence represents the order of volumes associated to a particular dataset. Occasionally a dataset exceeds the capacity of the volume to which it is being written and more volumes are needed to contain the dataset. In this case a chain of volumes are grouped together, the volume sequence defines the order in which the volumes should be accessed.

EXAMPLE

| Dataset | Device Type | Volume Serial | File Sequence | Volume Sequence | Note |
|---|---|---|---|---|---|
| SYS2.DATASET.FIVE | 3390 | PRD001 | 0 | 1 | Disk device type: 3390, file sequence is 0 for disk datasets |
|  | 3390 | PRD002 | 0 | 2 |  |

All catalog activity is captured by SMF task 114 through SMF data storage 110. Specifically, SMF data is created within the operating system via SMF task 114 which tracks catalog activity. Thus, catalog task 112 keeps track of the location of all data on the system in USERCATALOG 108, and SMF task 114 writes SMF audit records to SMF storage 110 that tracks the catalog activity. More specifically, catalog services create an audit log of catalog activity as datasets are created, modified (adding volumes to a dataset), or deleted.

EXAMPLE

| | |
|---|---|
| Dataset delete action | SMF type 17 |
| Define activity | SMF type 61 |
| Delete/Uncatalog activity | SMF type 65 |
| Alter activity | SMF type 66 |
| Rename | SMF type 18 |

Having an accountability of where dataset exists along a timeline scale is beneficial. In the course of normal task activity, data is read, created and used data is deleted. At times, it is necessary to recover data from backups that were taken along a timeline, e.g.: Tuesday at 16:00. The conventional USERCATALOG 108 structure falls short, because it only allows a user, via a user terminal (not shown), to determine where data is currently. On the other hand, the 3D Virtual Katalog 202 described below records this activity along a timeline.

Figure 2:
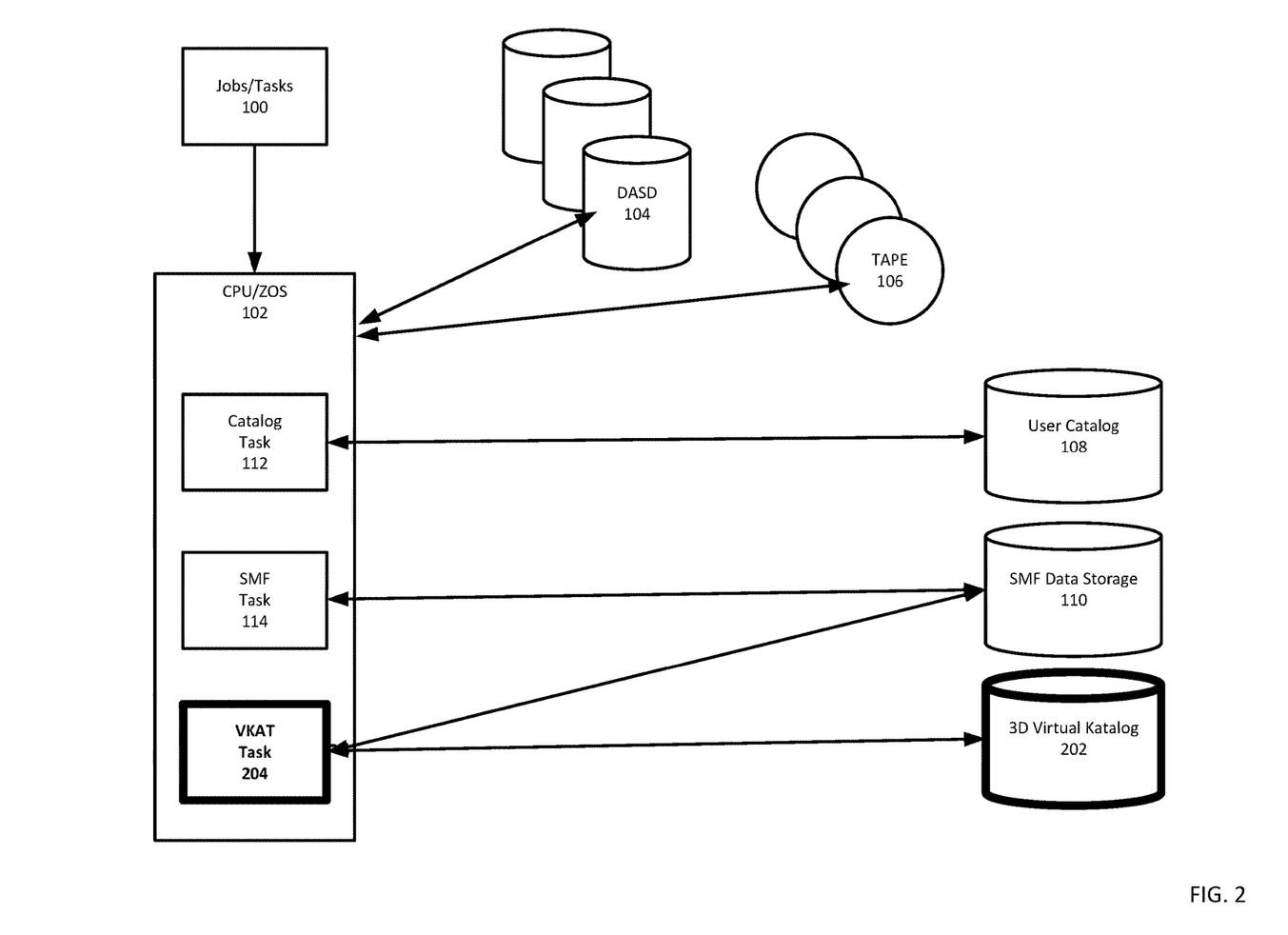
FIG. 2 is a process flow diagram of an example of a process for reading and writing to DASD and Tape and selecting and extracting the system management facility data for cataloging in the 3D Virtual Katalog from extracted SMF data.

Specifically, VKAT Task 204 and the 3D Virtual Katalog 202, shown in FIG. 2, implemented alongside the IBM mainframe, is a unique facility (e.g. program) that runs parallel to the z/OS system USERCATALOG 108 and provides a dimension which records dataset activity alongside the information that the z/OS USERCATALOG 108 maintains. By pairing the information that is maintained in the USERCATALOG 108 in conjunction with the information maintained in the 3D Virtual Katalog 202, the system can account for current dataset location, and location for datasets that have been deleted and/or altered to accommodate more volumes. This information is valuable when there are backups of volumes (thousands) and a user needs to know when and where data existed at specific points in time.

Whereas the catalog environment includes multiple USERCATALOGS 108 to account for all data in the z/OS environment, the 3D Virtual Katalog 202 tracks data as it changes from the point at which the systems starts. In operation, a 3D Virtual Katalog task VKAT task 204 executed by CPU 102 intercepts SMF data pertaining to user catalogue activity and populates/maintains 3D Virtual Katalog 202. Key fields in 3D Virtual Katalog 202 include dataset name and activity timestamp detailing the times of each activity of the dataset. The 3D Virtual Katalog task may maintain an anchor control block and remove old records to keep the system properly and efficiently managed. As a result, the 3D Virtual Katalog 202 occupies a fraction of the space of the z/OS catalog 108 space itself. The 3D Virtual Katalog 202 is a keyed indexed data structure with the key consisting of the name of the dataset itself along with a timestamp of activity of the datasets being monitored. The monitored datasets can be a segment of all datasets or set to all datasets depending on requirements of the users of the system. A monitor process will scan for the Catalog activity records from SMF 110, and record the activity in the 3D Virtual Katalog 202 itself. A user, via a user terminal (not shown), could then walk through the records associated to a dataset or multiple datasets to determine when and where this data existed at any particular time since the system was started. This collection will continue as long as the system is reading the SMF activity records or as far back as the user wants to account for dataset activity.

Primary fields of the 3D Virtual Katalog Structure include in part of the following fields:

DATASET NAME: This is the key and only 1 record exists for each dataset

ACTIVITY TIMESTAMP: The date and time a catalog activity occurred.

EVENT: The captured event that changed the dataset being monitored e.g.:

Create/Catalogued

Delete/Uncatalogued

Rename

Volume added

DEVICE TYPE: The device type that the data resides. e.g.: 3390 DASD device

VOLUME SERIAL: Each volume is six digits in length using characters or numbers

FILE SEQUENCE: Relative position of the dataset, particularly sequential TAPE

VOLUME SEQUENCE: The relative position of a volume for datasets that extend unto multiple volumes. This assures that data is read in the proper chronological order.

In general, Dataset Name and Activity Timestamp are the fields which are used to create a unique key for each record in the 3D Virtual Katalog 202.

In addition to maintaining records which correlate to the datasets being monitored with the Virtual 3D Katalog, the system maintains an anchor control block record which defines the span of time the system is recording. A retention parameter defines how far back the system should maintain Virtual 3D Katalog information. On a periodic basis, the system performs maintenance to remove older records that exceed the retention period. For example, if the system is configured for a 7 day retention, the maintenance phase may remove records that exceed the retention threshold and adjust the anchor control block to reflect the current adjusted time value.

Figure 3:
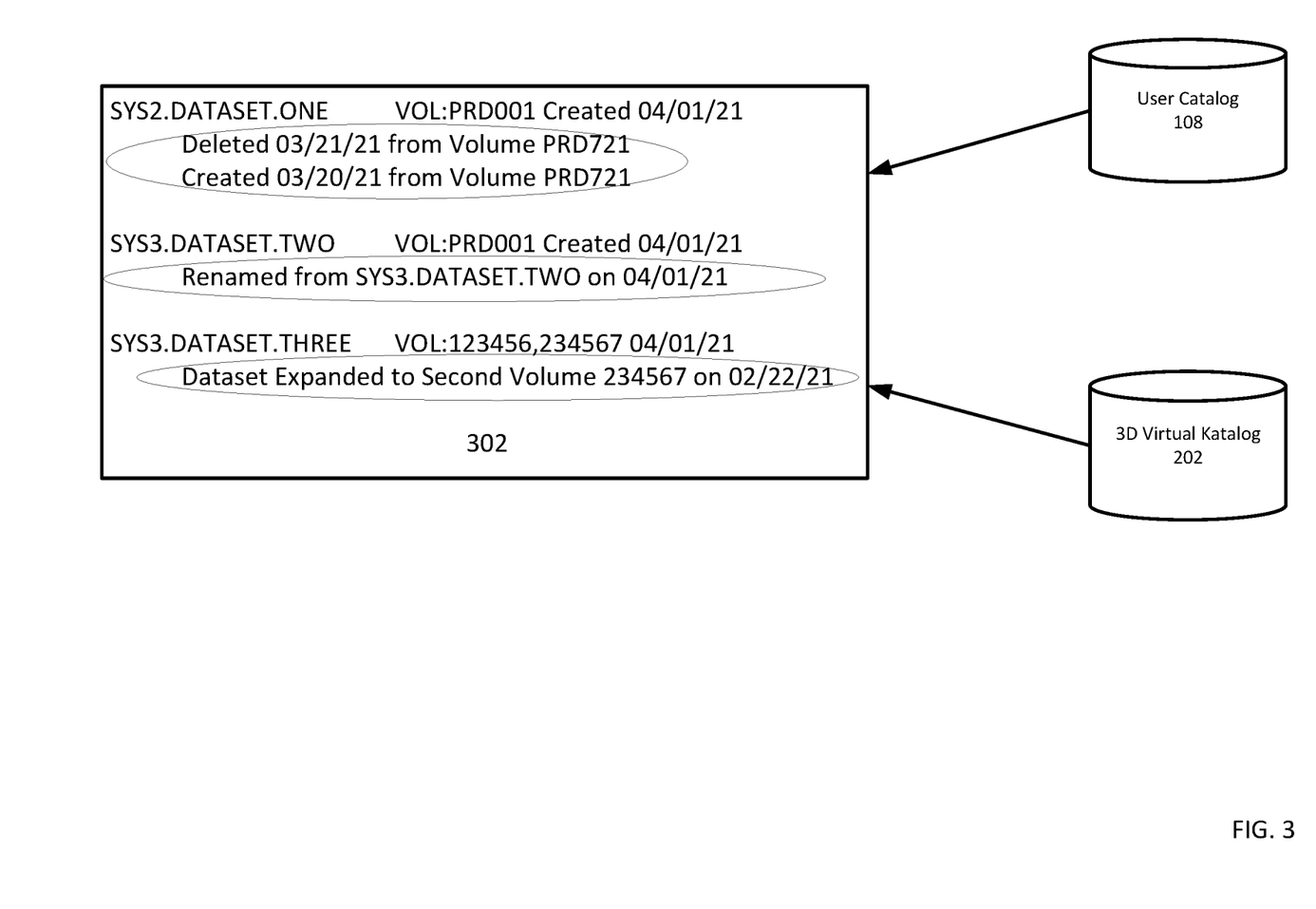
FIG. 3 is an example of an Interface showing information stored in the 3D Virtual Katalog as compared to the USER-CATALOG.

An example of the type of information stored in the 3D Virtual Katalog 202 as compared to the USERCATALOG 108 is shown in FIG. 3. It is known that the USERCATALOG 108 by itself only provides limited information regarding data. However, the 3D Virtual Katalog Interface Display 302 shown in FIG. 3 draws information from the USERCATALOG 108 (un-circled information) and the 3D Virtual Katalog 202 (circled information) to provide a complete picture for the datasets being monitored. This includes displaying information as to when and where (e.g. what volume) SYS2.DATASET.ONE is created and deleted, information as to when SYS3.DATASET.TWO is renamed and information as to when and where (e.g. what volume) SYS3.DATASET.THREE is expanded. For explanation purposes, three specific examples of the 3D Virtual Katalog 202 in operation are described below:

Example 1

1. SYS3.DATASET.SIX was on the system for 1 day, between April 1 and April 2.

Someone wants to restore a copy of this dataset when the volume backups occurred.

USERCATALOG: contains no record for this dataset

3D Virtual Katalog: contains the following:

| dataset | Date/time | activity | device | Fileseq | Volumes(s) |
| --- | --- | --- | --- | --- | --- |
| SYS3.DATASET.SIX | Apr. 1, 2021 09:00 | defined | 3390 | 0 | PROD01 PROD02 |
| SYS3.DATASET.SIX | Apr. 2, 2021 23:00 | DELETE UNCATALOG | 3390 | 0 | PROD01 PROD02 |

From the information contained in the 3D Virtual Katalog 202, the user knows the dataset existed from 4/1 @ 9:00 to 4/2 @ 23:00 on 2 volumes PROD01 and PROD02

Example 2

2. An old dataset, TEST.OLD.DSN was deleted from the USERCATALOG on April $15^{th}$.

USERCATALOG: contains no record for this dataset

3D Virtual Katalog: contains the following:

| dataset | Date/time | activity | device | Fileseq | Volumes(s) |
| --- | --- | --- | --- | --- | --- |
| TEST.OLD.DATASET | Apr. 15, 2021 07:21 | DELETE UNCATALOG | 3390 | 0 | TEST21 |

From the 3D Virtual Katalog 202, the user can see that the dataset existed on TEST21 until 4/15 @ 7:21 am Example 3

3. Look up existing old dataset TEST.OLD.DATASET.TWO USERCATALOG:

| dataset | Created | device | Fileseq | Volumes(s) |
| --- | --- | --- | --- | --- |
| TEST.OLD.DATASET.TWO | Mar. 1, 2021 02:00 | 3390 | 0 | DEV201 DEV202 |

3D Virtual Katalog: contains the following:

| dataset | Date/time | activity | device | Fileseq | Volumes(s) |
| --- | --- | --- | --- | --- | --- |
| TEST.OLD.DATASET.TWO | Mar. 1, 2021 09:00 | Created defined | 3390 | 0 | DEV201 |
| TEST.OLD.DATASET.TWO | Mar. 9, 2021 09:00 | Addvol DEV202 | 3390 | 0 | DEV201 DEV202 |

The current z/OS USERCATALOG 108 shows the dataset being allocated to 2 volumes, DEV201/DEV202, the 3D Virtual Katalog 202 adds dimension showing that the dataset was originally a single volume dataset that grew to 2 volumes on March $9^{th}$ at 09:00 am. The 3D Virtual Katalog 202 adds a dimension that a user otherwise would not know about.

A collection of tools will be provided to list information from the 3D Virtual Katalog 202. These programs will be designed to interact with the standard interfaces such as:
Catalog Search Interface
IDCAMS List facility
Catalog locate service After providing the standard information from the Catalog itself through standard interfaces, a more timelined detail will be provided that incorporates the fields captured through SMF collection from 3D Virtual Katalog 202. This data will span from current time back to the range of time as recorded in the anchor control block. The 3D Virtual Katalog 202 provides benefits that include locating which volumes datasets resided at particular times throughout the life cycle of a dataset.

Figure 4:
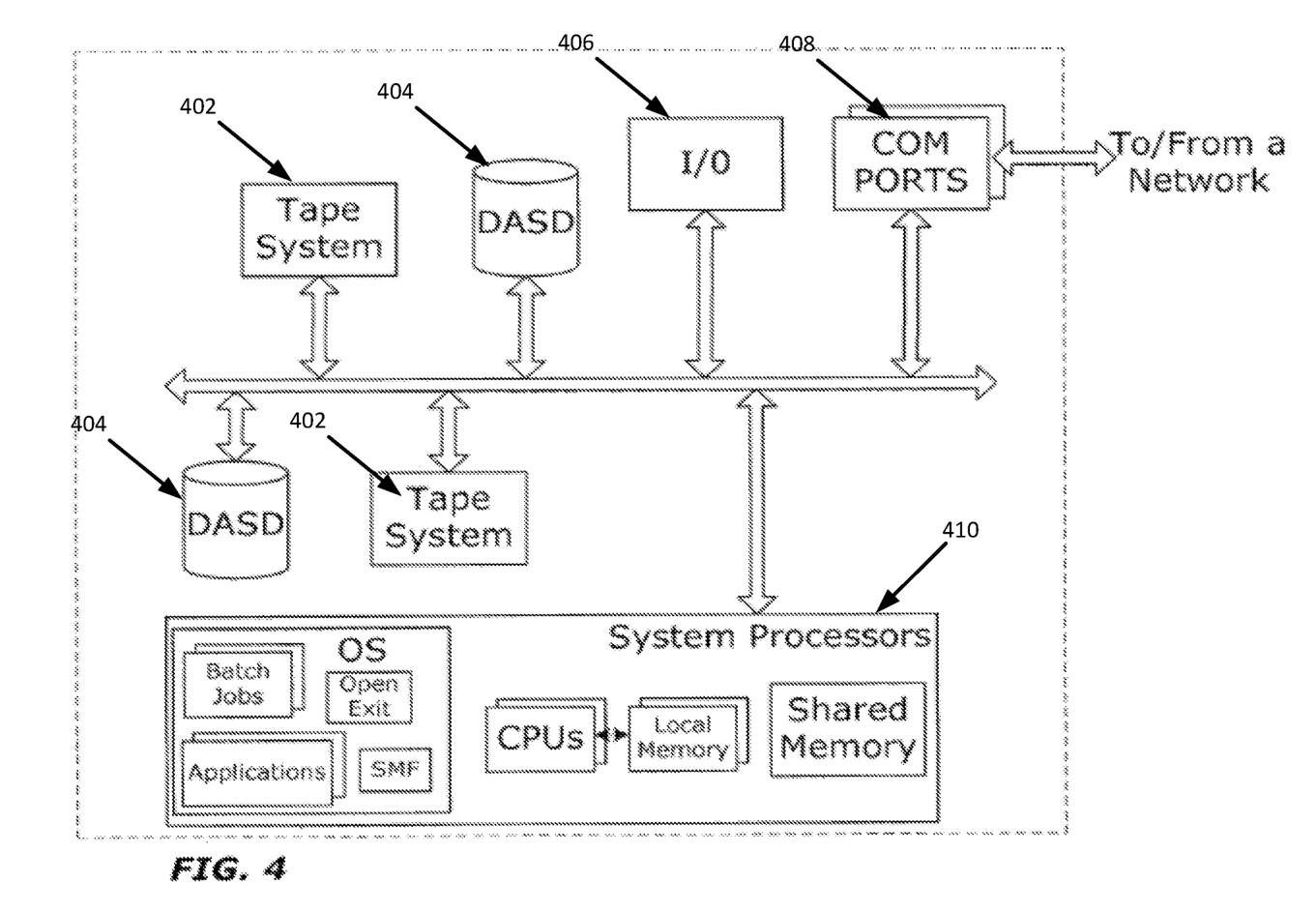
FIG. 4 is a simplified functional block diagram of a computer that may be configured as a server and/or mainframe.
Figure 5:
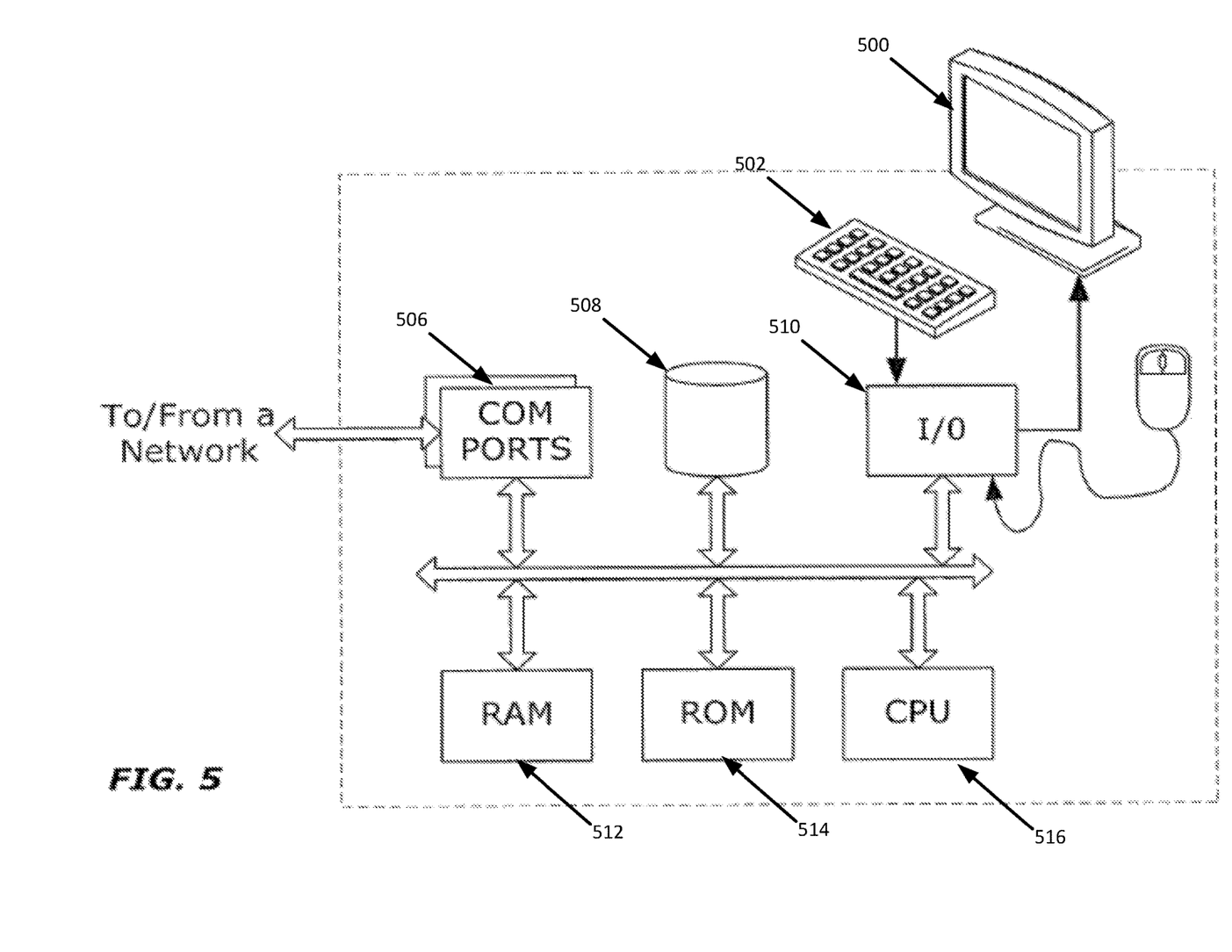
FIG. 5 is a simplified functional block diagram of a personal computer or other work station or terminal device.

FIGS. 4 and 5 provide functional block diagram illustrations computer hardware platforms. FIG. 4 illustrates a network or host computer platform, as may typically be used to implement a server and/or mainframe including but not limited to tape systems 402, DASDs 404, user input/output 406, communication ports 408 and system processors 410 including CPUs, memory, an operating system, applications, batch jobs, SMF and the like. FIG. 5 depicts a computer with user interface elements, as may be used to implement a personal computer or other type of work station or terminal device, although the computer of FIG. 5 may also act as a server if appropriately programmed. In this example, the computer in FIG. 5 includes monitor 500, keyboard 502, mouse 504, communication ports 506, database 508, user I/O 510, RAM 512, ROM 514, CPU 516 and the like. It is believed that the structure and general operation of such equipment as shown in FIGS. 4 and 5 should be self-explanatory from the high-level illustrations.

It is noted that a mainframe, for example, includes a data communication interface for packet data communication and an input/output (I/O) controller. The I/O controller manages communication to various I/O elements and storage facilities. Storage facilities include one or more direct access storage devices (DASD) and/or one or more tape systems. Such storage facilities provide storage for data, jobs for managing batch processing and applications. The mainframe includes an internal communication bus providing a channel of communication between the communications ports, the I/O controller, and one or more system processors. Each system processor includes one or more central processing units (CPUs) and local memory corresponding to each CPU, as well as shared memory available to any CPU. An operating system (OS) executed by the system processors manages the various jobs and applications currently running to perform appropriate processing. The OS also provides a system management facility (SMF) and open exit points for managing the operation of the mainframe and the various jobs and applications currently running. The hardware elements, operating systems, jobs and applications of such mainframes are conventional in nature. Of course, the mainframe functions may be implemented in a distributed fashion on a number of similar platforms, to distribute the processing load, and/or replicated across one or more similar platforms, to provide redundancy for the processing. As such, FIG. 4 also depicts a replicated environment. Although details of the replicated environment are not depicted, such replicated environment typically contains similar components as already described in relation to the primary mainframe of FIG. 4.

It is also noted that a computer type user terminal device, such as a PC, similarly includes a data communication interface CPU, main memory and one or more mass storage devices for storing user data and the various executable programs. The various types of user terminal devices will also include various user input and output elements. A computer, for example, may include a keyboard and a cursor control/selection device such as a mouse, trackball, or touchpad; and a display for visual outputs. The hardware elements, operating systems and programming languages of such user terminal devices also are conventional in nature.

Hence, aspects of the methods for recording the time each step within a job executing within a mainframe computing environment begins and ends outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through a global information network (e.g. the Internet®) or various other telecommunication networks. Such communications, for example, may enable loading of the software from one computer or processor into another, for example, from a management server or host computer into the mainframe platform that will execute the various jobs. Thus, another type of media that may bear the software elements includes optical, electrical and electromagnetic waves, such as used across physical interfaces between local devices, through wired and optical landline networks and over various air-links. As used herein, unless restricted to non-transitory, tangible "storage" media, terms such as computer or machine "readable medium" refer to any medium that participates in providing instructions to a processor for execution.

Non-volatile storage media include, for example, optical or magnetic disks, such as any of the storage devices in any computer(s) or the like, such as may be used to hold datasets and programs for enterprise applications. Volatile storage media include dynamic memory, such as main memory of such a computer platform. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge or any other medium from which a computer can read programming code and/or data. Many of these forms of computer readable media may be involved in carrying one or more sequences of one or more instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system for use in restoring data processing capabilities in the event of an interruption, comprising:
    a processor;
    a storage device accessible by the processor;
    a user catalog program that when executed by the processor configures the system to store indexes of data utilized by the system;
    a system management facility (SMF) program that when executed by the processor configures the system to create SMF audit records that track user catalog activity as SMF data; and
    a virtual catalog program that when executed by the processor configures the system to:
    intercept portions of the SMF data over a timeline, the portions corresponding to the creation, deletion, and modification of the data files, and catalog the intercepted portions of SMF data over the timeline in a virtual catalog;
    wherein the data utilized by the system includes a dataset; and additional event data related to use of that dataset after an interruption is detected;
    the processor restores data processing capabilities of the system based on a combination of the stored indexes from the user catalog program and the intercepted portions of SMF data from the virtual catalog program; and
    a respective catalog activity record of the user catalog activity accounting for a location of the dataset that was deleted and/or altered prior to the interruption is absent from a respective stored index of the stored indexes but information about the dataset that was deleted and/or altered is present in the virtual catalog.

2. The system of claim 1, wherein the virtual catalog program that when executed by the processor further configures the system to associate a system user with the intercepted portions of the SMF data.

3. The system of claim 1, wherein the virtual catalog program that when executed by the processor further configures the system to include a time stamp with each intercepted portion of the SMF data.

4. The system of claim 1, wherein the virtual catalog program that when executed by the processor further configures the system to identify a storage device storing each intercepted portion of the SMF data.

5. The system of claim 1, wherein the virtual catalog program that when executed by the processor further configures the system to, after an interruption is detected, display the combination of the stored indexes from the user catalog program and the intercepted portions of SMF data from the virtual catalog program in a chronological order.

6. The system of claim 1, wherein restoring data processing capabilities of the system includes configuring the respective catalog activity record to be restored in the respective stored index of the stored indexes.

7. The system of claim 1, wherein the SMF program does not know which of the data utilized by the system is open at a point in time.

8. The system of claim 1, wherein the SMF program does not know which job is processing which of the data utilized by the system at a point in time.

9. The system of claim 1, wherein the SMF data only allows a determination of where the data utilized is at a current time.

10. A non-transitory computer readable medium for use in restoring data processing capabilities in the event of an interruption, comprising:
    a user catalog program embodied in the medium, that when executed by a processor configures the system to store indexes of data utilized by the system;
    a system management facility (SMF) program embodied in the medium, that when executed by the processor configures the system to create SMF audit records that track the catalog activity as SMF data; and
    a virtual catalog program embodied in the medium, that when executed by the processor configures the system to:
    intercept portions of the SMF data over a timeline, the portions corresponding to the creation, deletion and modification of the data files, and
    catalog the intercepted portions of SMF data over the timeline in a virtual catalog;
    wherein the data utilized by the system includes a dataset; and additional event data related to use of that dataset after an interruption is detected:
    the processor restores data processing capabilities of the system based on a combination of the stored indexes from the user catalog program and the intercepted portions of SMF data from the virtual catalog program; and
    a respective catalog activity record of the user catalog activity accounting for a location of the dataset that was deleted and/or altered prior to the interruption is absent from a respective stored index of the stored indexes but information about the dataset that was deleted and/or altered is present in the virtual catalog.

11. The non-transitory computer readable medium of claim 10, wherein the virtual catalog program that when executed by the processor further configures the system to associate a system user with the intercepted portions of the SMF data.

12. The non-transitory computer readable medium of claim 10, wherein the virtual catalog program that when executed by the processor further configures the system to include a time stamp with each intercepted portion of the SMF data.

13. The non-transitory computer readable medium of claim 10, wherein the virtual catalog program that when executed by the processor further configures the system to identify a storage device storing each intercepted portion of the SMF data.

14. The non-transitory computer readable medium of claim 10, wherein the virtual catalog program that when executed by the processor further configures the system to after an interruption is detected, display the combination of the stored indexes from the user catalog program and the intercepted portions of SMF data from the virtual catalog program in a chronological order.

15. A method for restoring data processing capabilities in the event of an interruption of a computing system, the method comprising:
- storing indexes of data utilized by the computing system using a user catalog program,
- creating SMF audit records that track user catalog activity as SMF data,
- intercepting portions of the SMF data over a timeline, the portions corresponding to creation, deletion, and modification of data files,
- cataloging the intercepted portions of the SMF data over the timeline in a virtual catalog, and
- after an interruption is detected, restoring data processing capabilities of the computing system based on a combination of the stored indexes and the intercepted portions of SMF data, wherein after the interruption is detected:
- a respective user catalog activity record of the user catalog activity is absent from a respective stored index of the stored indexes, but the absent user catalog activity relates to creation, deletion, or modification of data files for which corresponding information about the creation, deletion, or modification is present in the virtual catalog,
- the respective catalog activity record of the catalog activity accounting for a location of a dataset that has been deleted and/or altered was present in the respective stored index at a prior time when a volume backup occurred, and
- restoring data processing capabilities of the system includes configuring the respective catalog activity record to be present in the respective stored index of the stored indexes as the respective catalog activity record was present at the prior time.

* * * * *